US008891769B2

(12) United States Patent
Furukawa

(10) Patent No.: US 8,891,769 B2
(45) Date of Patent: Nov. 18, 2014

(54) NAME ENCRYPTION DEVICE, PSEUDONYMIZATION DEVICE, NAME ENCRYPTION METHOD, AND PSEUDONYMIZATION METHOD

(75) Inventor: Jun Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 251 days.

(21) Appl. No.: 13/063,512

(22) PCT Filed: Oct. 7, 2009

(86) PCT No.: PCT/JP2009/067520
§ 371 (c)(1),
(2), (4) Date: Mar. 11, 2011

(87) PCT Pub. No.: WO2010/041698
PCT Pub. Date: Apr. 5, 2010

(65) Prior Publication Data
US 2011/0182430 A1     Jul. 28, 2011

(30) Foreign Application Priority Data
Oct. 7, 2008   (JP) ................. 2008-260584

(51) Int. Cl.
*H04L 29/06*     (2006.01)
*H04L 9/14*     (2006.01)
*H04L 9/08*     (2006.01)
*H04L 9/30*     (2006.01)
*H04L 9/32*     (2006.01)

(52) U.S. Cl.
CPC ............ *H04L 9/14* (2013.01); *H04L 9/0844* (2013.01); *H04L 9/3073* (2013.01); *H04L 9/3218* (2013.01); *H04L 2209/42* (2013.01); *H04L 2209/88* (2013.01)

USPC ...................................................... 380/277

(58) Field of Classification Search
None
See application file for complete search history.

(56) References Cited

FOREIGN PATENT DOCUMENTS

JP    7-336348 A    12/1995
JP    2001094556 A    4/2001

OTHER PUBLICATIONS

International Search Report for PCT/JP2009/067520 mailed Dec. 8, 2009.
A. Noumeir et al., "Pseudonymization of Radiology Data for Research Purposes", Journal of Digital Imaging, vol. 20, No. 3, Sep. 2007, pp. 284-295.
H. Saito, "A Signature Protocol Using ESIGN Signature Scheme with Shared Plaintext", IEICE Technical Report, Nov. 20, 1998, vol. 98, No. 426, pp. 53-60.
M. Manbo, "Ango no Suri Digital Shakai no Security". Mathematical Sciences, Sep. 2000, No. 447, pp. 48-54.

*Primary Examiner* — David Le
(74) *Attorney, Agent, or Firm* — Sughrue Mion, PLLC

(57) ABSTRACT

Provided is a name encryption device which suppresses leak and facilities the zero-knowledge proof by making the pseudonymization process to be a simple algebraic calculation. The name encryption device converts an encrypted name text into a pseudonym-encrypted text by dispersing the encrypted name text. The encryption device disperses a name into a plurality of name parts to generate a commitment for each of the parts and encrypts disclosure information and each of the name parts by respective public keys. The encryption device outputs the disclosure information relating to the respective commitments and encrypted texts obtained by the respective public keys of the name parts.

10 Claims, 3 Drawing Sheets

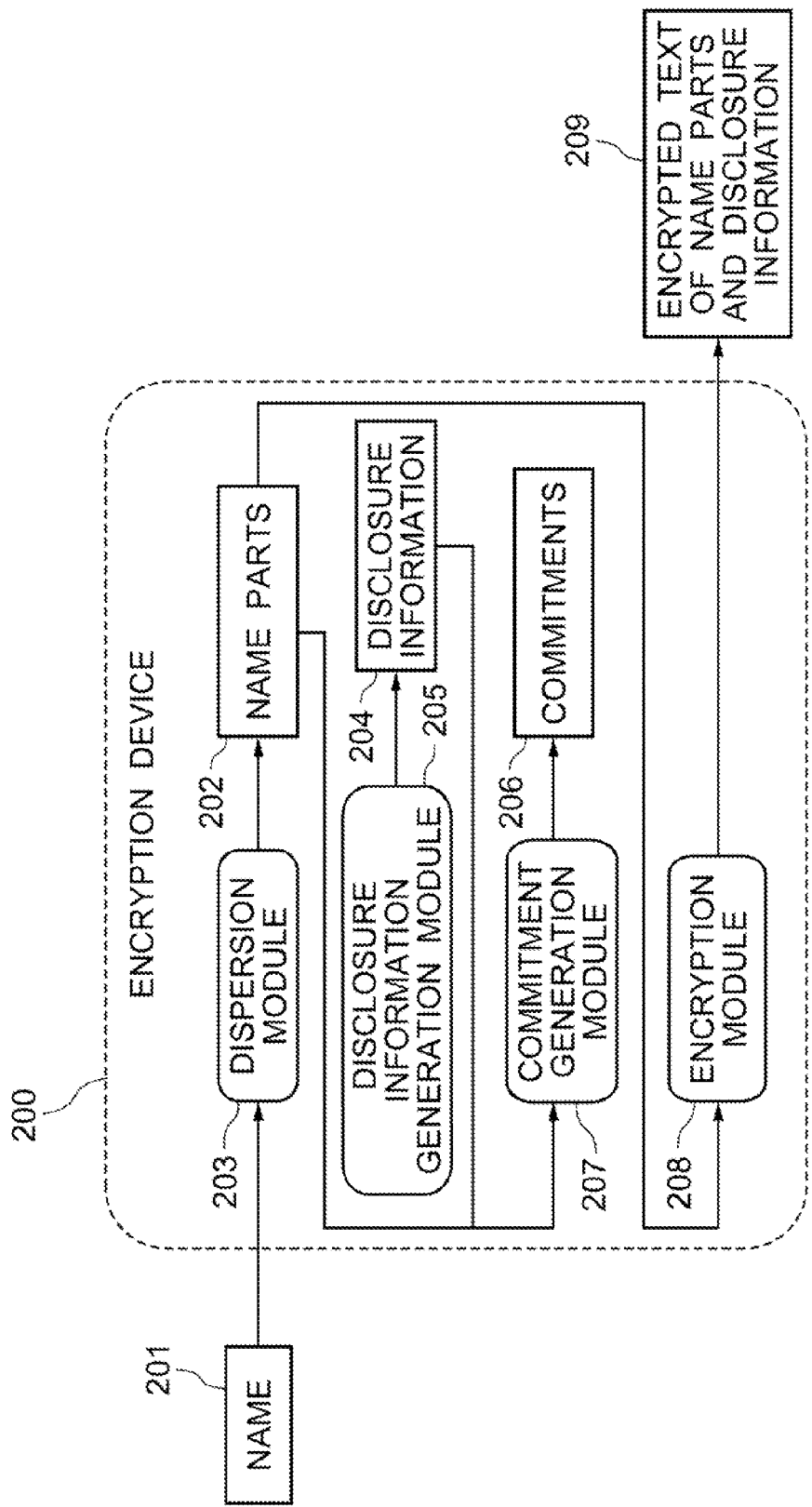

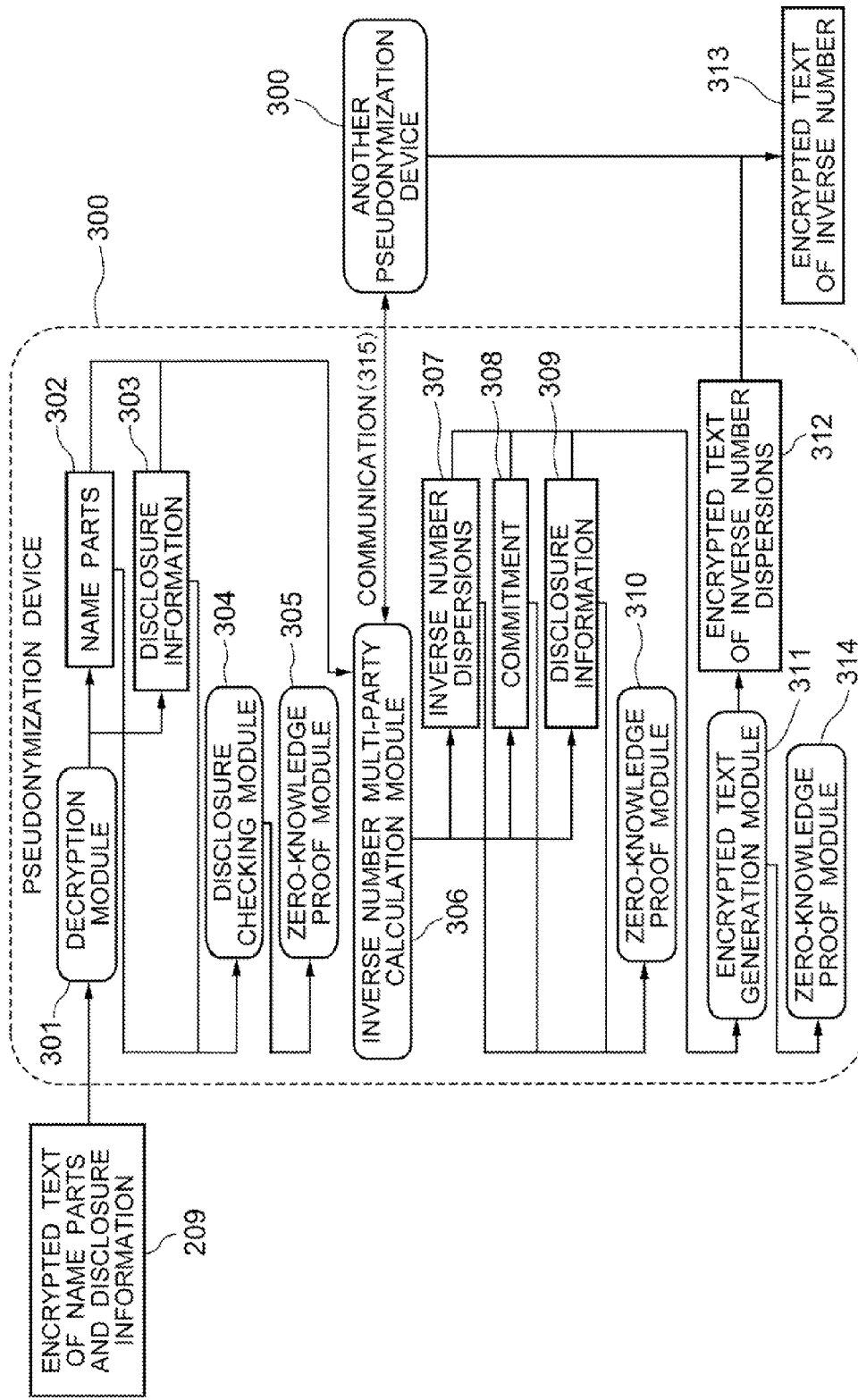

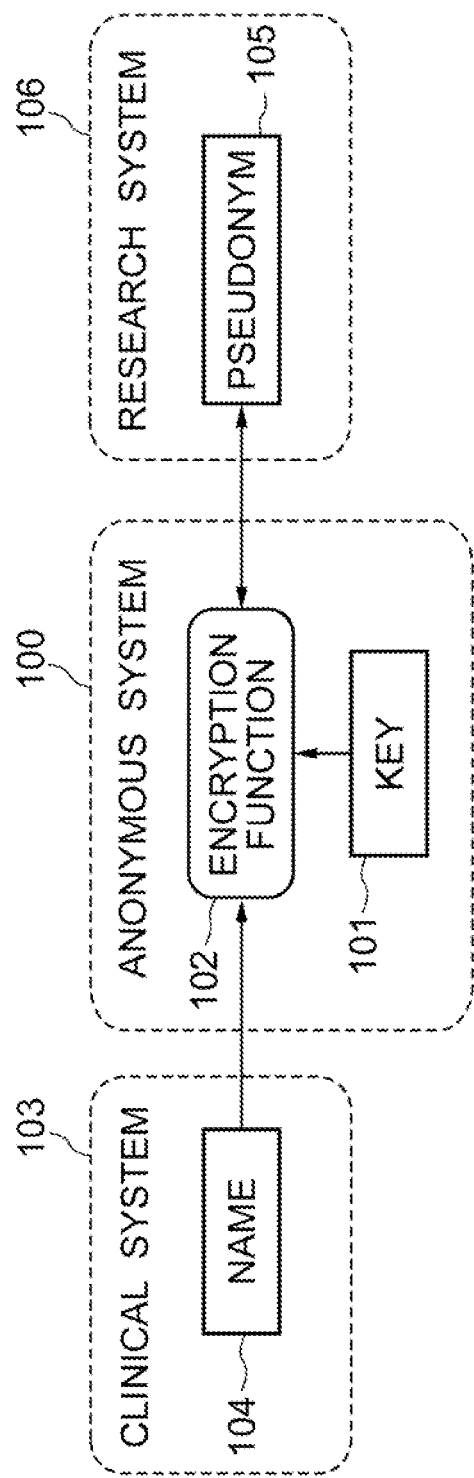

NAME ENCRYPTION DEVICE, PSEUDONYMIZATION DEVICE, NAME ENCRYPTION METHOD, AND PSEUDONYMIZATION METHOD

This Application is the National Phase of PCT/JP2009/067520, filed Oct. 7, 2009, which claims the Priority right based on Japanese Patent Application No. 2008-260584 filed on Oct. 7, 2008 and the disclosure thereof is hereby incorporated by reference in its entirety.

TECHNICAL FIELD

The present invention relates to a technique which converts a name of a patient into a pseudonym, for example, and handles the personal information of the patient based on the pseudonym.

BACKGROUND ART

As a related system for pseudonymization, there is a method presented in Non-Patent Document 1. Hereinafter, the method of Non-Patent Document 1 will be described by referring to FIG. 3.

An anonymous system 100 for pseudonymization includes an encryption function 102 of a common key encryption system and a key 101 required for the encryption function 102. Further, the anonymous system 100 inputs information of a name 104 from a clinical system 103 as an element of the encryption function 102.

According to an operation of an authorized person, the anonymous system 100 inputs the information of the name 104 to the encryption function 102 and inputs information of the key 101 as an element of the encryption function, executes an arithmetic operation by the encryption function 102, and outputs information of a pseudonym 105 to a research system 106.

Non-Patent Document 1: Alain Lemay, Jean-MarcLinal, "Pseudonymization of Radiology Data for Research Purposes", Journal of Digital Imaging, Volume 20, Number 3/September, 2007, pp. 284-295

DISCLOSURE OF THE INVENTION

Problems to be Solved by the Invention

With the related technique described above, those who do not know the key 101 held by the authorized person cannot determine whether or not the name 104 and the pseudonym 105 are in a corresponding relation even by comparing the name 104 inputted to the anonymous system 100 with the outputted pseudonym 105.

The related technique described above converts the name 104 into the pseudonym 105 by using the common key encryption system. However, encryption processing of common key cryptography used in the related technique is difficult to be done in an efficiently variant manner. Thus, the administrator of the anonymous system 100 needs to manage all the keys 101 that are required for the common key encryption processing in the anonymous system 100.

This means that the management of all the keys 101 is centralized on a single administrator, so that the administrator can easily leak the information of all the keys 101 if the administrator desires to do so. Under such condition, it is difficult to take a measure for preventing the leak of the key information. The encryption processing of the common key cryptography is not simple algebraically, and it is an issue of the related technique described above to efficiently execute authentication of the correspondence between the inputted name and the pseudonym while keeping secrecy of the key used for pseudonymization.

With the related technique described above, the name 104 is encrypted and the pseudonym 105 is outputted by using the common key encryption system. The algorithm of the encryption is a changeover of elements that form the name 104, for example, so that the information of the name 104 and the pseudonym 105 can be decrypted by returning the changed elements. The administrator of the anonymous system 100 can acquire the decryptable information. Based on that, it is also considered that there still remains a possibility of leaking the information of the name 104 and the pseudonym 105.

The present invention is designed to overcome the issues described above. An object of the present invention is to provide a name encryption device which converts an encrypted text of a name into an encrypted text of a pseudonym in a variant manner, a pseudonymization device, a name encryption method, and a pseudonymization method, which make it possible to hide the data of the inputted name and the outputted pseudonym from the authorized people through encrypting those into an encrypted text, make it difficult to leak information by increasing the number of authorized people that are required to collude with for leaking the keys through distributing the keys for pseudonymization to a plurality of authorized people and executing the processing of pseudonymization by those authorized people in a variant manner, and make it easy to perform zero-knowledge proof by using a simple algebraic operation for pseudonymization.

Means for Solving the Problems

The name encryption device according to the present invention is characterized to include:
- a device which receives a plurality individual public keys that are public keys of an encryption system, a general public key that is a public key of the encryption system, a parameter of a commitment, and a name;
- a dispersion device which disperses the name into a plurality of name parts;
- a device which generates respective commitments of the plurality of name parts;
- a device which encrypts disclosure information of each of the commitments and each of the plurality of name parts with the individual public keys; and
- a device which outputs each of the commitments of the plurality of name parts, and an encrypted text of the disclosure information of the each of the commitments and the plurality of name parts generated according to the individual public keys.

Further, the pseudonymization device according to the present invention is a device which cooperates with another device having a same structure to perform pseudonymization, and the pseudonymization device is characterized to include:
- a device which saves an individual public key and an individual private key corresponding to the own device;
- a device which receives an encrypted text of a name part and disclosure information of a commitment of the name part generated according to the individual public key of the own device, the commitment of the name part, and a commitment of a pseudonymization key;
- a device which decrypts the encrypted text to generate the disclosure information of the name part and the commitment of the name part, and checks that it is a disclosure of the commitment of the name part;

an inverse number calculation device which generates dispersions of an inverse number of a sum of the name and the pseudonymization key through communicating with the other device having the same structure;

a device which generates an encrypted text of the dispersions of the inverse number of the sum of the name and the pseudonymization key according to the general public key; and an output device which outputs the encrypted text of the dispersions of the inverse number of the sum of the name and the pseudonymization key according to the general public key.

Furthermore, the name encryption method according to the present invention is characterized to include:

a step of inputting a plurality individual public keys that are public keys of an encryption system, a general public key that is a public key of the encryption system, a parameter of a commitment, and a name;

a step of dispersing the name into a plurality of name parts;

a step of generating respective commitments of the plurality of name parts;

a step of encrypting disclosure information of each of the commitments and each of the plurality of name parts with the individual public keys; and a step of outputting each of the commitments of the plurality of name parts, and an encrypted text of the disclosure information of the each of the commitments and the plurality of name parts generated according to the individual public keys.

Further, the pseudonymization method according to the present invention is a method used in a pseudonymization device which cooperates with another device having a same structure to perform pseudonymization, and the pseudonymization method is characterized to include:

a step of saving an individual public key and an individual private key corresponding to the own device;

a step of inputting an encrypted text of a name part and disclosure information of a commitment of the name part according to the individual public key of the own device, the commitment of the name part, and a commitment of a pseudonymization key;

a step of decrypting the encrypted text to generate the disclosure information of the name part and the commitment of the name part, and checking that it is a disclosure of the commitment of the name part;

a step of generating dispersions of an inverse number of a sum of the name and the pseudonymization key through communicating with the other device having the same structure;

a step of generating an encrypted text of the dispersions of the inverse number of the sum of the name and the pseudonymization key according to the general public key; and a step of outputting the encrypted text of the dispersions of the inverse number of the sum of the name and the pseudonymization key according to the general public key.

Effect of the Invention

The present invention is capable of making it difficult to leak information, making it easy to execute the zero-knowledge proof by using a simple algebraic operation for pseudonymization, and making it possible to convert the encrypted text of the name into the encrypted text of pseudonym in a variant manner.

BRIEF DESCRIPTION OF THE DRAWINGS

FIG. 1 is a block diagram showing a name encryption device used in an information management system according to an exemplary embodiment of the invention;

FIG. 2 is a block diagram showing a pseudonymization device used in the information management system according to the exemplary embodiment of the invention; and FIG. 3 is a block diagram showing a related pseudonymization system.

BEST MODES FOR CARRYING OUT THE INVENTION

Hereinafter, an exemplary embodiment of the invention will be described in details by referring to the drawings.

An information management system according to the exemplary embodiment of the invention is a combination of a name encryption device 200 shown in FIG. 1 and a pseudonymization device 300 shown in FIG. 2. The information management system (200, 300) according to the exemplary embodiment of the invention is a device employed in a clinical field of medical sciences, for example, which converts the name of a patient stored in a database of a clinical system 103 in FIG. 3 into the pseudonym, and makes it possible to analyze medical treatment data of the patient stored in the database under the pseudonym with a research system 106.

Hereinafter, a case of employing the information management system (200, 300) according to the exemplary embodiment of the invention into the clinical field that handles patients' medical treatment data will be described. However, the applicable range of the exemplary embodiment of the invention is not limited only to the clinical field. The information management system (200, 300) according to the exemplary embodiment of the invention can be applied to any fields, as long as it is the field in which the pseudonymization of the name of a user is performed and personal information, etc. of the user is handled under the pseudonym.

The name encryption device 200 used in the information management system according to the exemplary embodiment of the invention encrypts the name of the patient stored in the database of the clinical system 103 shown in FIG. 3. The name encryption device 200 includes a dispersion module 203, a disclosure information generation module 205, a commitment generation module 207, and an encryption module 208.

The dispersion module 203 reads out the name of the patient (user) stored in the database of the clinical system 103 shown in FIG. 3 and disperses the name into two or more phrases, so that the patient cannot be specified by the dispersed name parts 202. The dispersion module 203 sets the number of dispersed phrases or the like of the name of the patient by corresponding it to the number of the pseudonymization devices 300 shown in FIG. 2 set in advance. While the exemplary embodiment is described by referring to a case where the name of the patient is dispersed into a unit of phrase, the exemplary embodiment is not limited only to such case. Any units of dispersion can be employed, as long as it is the unit with which the patient cannot be specified from the dispersed name parts.

The disclosure information generation module 205 generates information regarding the name parts 202 dispersed by the dispersion module 203 as disclosure information 204. The disclosure information 204 contains frame information of the name parts 202 allotted to the two or more pseudonymization devices 300 shown in FIG. 2, the name parts 202 contained in the phrase, and the like.

The commitment generation module 207 receives the dispersed name parts 202 outputted from the dispersion module 203 and the disclosure information 204 outputted from the disclosure information generation module 205, and generates commitments 206 regarding the dispersed name parts 202 and the disclosure information 204.

The encryption module 208 uses the ElGamal encryption system to generate an encrypted text by encrypting the dispersed name parts 202 and the commitment 206 related to the name, and uses the public key encryption system to generate an encrypted text by encrypting the disclosure information 204. In FIG. 1, the encrypted text of the name parts 202 and the commitment 206 and the encrypted text of the disclosure information 204 are expressed as an encrypted text 209 in an integrated manner.

Specifically, the encryption module 208 generates the number (corresponding to the number of the pseudonymization devices 300 shown in FIG. 2 set in advance) of pairs of public keys and private keys required for the ElGamal encryption system, and generates a pair of the public key and the private key required for the public key encryption system. Further, the encryption module 208 generates the encrypted text of the name parts 202 and the commitment 206 by using the public key of the ElGamal encryption system, and generates the encrypted text of the disclosure information 204 by using the public key of the public key encryption system. In the explanations below, the public key and the private key in a pair required for the ElGamal encryption system are expressed as an individual public key and an individual private key. Further, the public key and the private key required for the public key encryption system are expressed as a common public key and a common private key.

The individual private keys of the ElGamal encryption system generated by the encryption module 208 by corresponding to the number of the pseudonymization devices 300 shown in FIG. 2 set in advance are allotted to each of the two or more pseudonymization devices 300 shown in FIG. 2. Therefore, each of the two or more pseudonymization devices 300 has the individual private key allotted thereto, and the encryption module 208 has all the individual public keys allotted to each of the two or more pseudonymization devices 300. In this case, the individual private keys allotted to each of the two or more pseudonymization devices 300 are different from each other.

Further, the common private key of the public key encryption system generated by the encryption module 208 is allotted to each of the two or more pseudonymization devices 300 shown in FIG. 2. Therefore, each of the two or more pseudonymization devices 300 has the common private key allotted thereto in common, and the encryption module 208 has all the common public keys allotted in common to the two or more pseudonymization devices 300. In this case, the individual private keys allotted to each of the two or more pseudonymization devices 300 are the same with each other.

As the basic structures, as shown in FIG. 2, the pseudonymization device 300 used in the information management system according to the exemplary embodiment of the invention has a decryption module 301, an inverse number multi-party calculation module 306, and an encrypted text generation module 311. Further, in addition to such structures, the pseudonymization device 300 has a disclosure checking module 304, a zero-knowledge proof module 305, a zero-knowledge proof module 310, and a zero-knowledge proof module 314.

The decryption module 301 receives the encrypted text 209 outputted from the name encryption device 200 and refers to the commitment 206 by using the individual private key of the ElGamal encryption system allotted to the own device to decrypt the dispersed name 302 allotted to the own device, and also decrypts disclosure information 303 by using the allotted common private key. The dispersed name part 302 is the name part 202 dispersed by the dispersion module 203, and it is the name part 202 allotted to the own device. Further, the decrypted disclosure information 303 corresponds to the disclosure information 204 generated by the disclosure information generation module 205.

The inverse number calculation module 306 includes a pseudonymization key for converting the dispersed name parts 303 into a pseudonym. The inverse number calculation module 306 performs a multi-party calculation by conducting a communication (315) mutually with another pseudonymization device 300, and converts the decrypted name part 303 into pseudonym that does not duplicate with pseudonym generated by another pseudonymization device 300 by using the pseudonymization key.

The inverse number calculation module 306 disperses the inverse number of the sum of the dispersed name parts 303 and the pseudonymization key so as not to overlap with the pseudonym generated by another pseudonymization device 300 to calculate the dispersion value of the inverse number, and generates it as information (307) of the pseudonym.

Further, the inverse number calculation module 306 generates a commitment 308 regarding the converted pseudonym and disclosure information 309 for disclosing the converted pseudonym.

The encrypted text generation module 311 generates an encrypted text 312 containing the converted pseudonym 307, the commitment 308, and the disclosure information 309 generated by the inverse number multi-party calculation module 306 by using the ElGamal encryption system, and discloses the encrypted text 312 on a communications net as an encrypted text 313.

Specifically, the encrypted text generation module 311 generates the number (corresponding to the number of the research systems 106 shown in FIG. 3 set in advance) of pairs of public keys and private keys required for the ElGamal encryption system, generates the encrypted text 312 containing the converted pseudonym 307, the commitment 308, and the disclosure information 309 by using the ElGamal encryption system, and discloses the encrypted text 312 on the communications net as the encrypted text 313.

The individual private keys of the ElGamal encryption system generated by the encrypted text generation module 311 by corresponding to the number of the research systems 106 shown in FIG. 3 set in advance are allotted to each of the two or more research systems 106 shown in FIG. 1. Therefore, each of the two or more research systems 106 has the individual private key allotted thereto, and the encrypted text generation module 311 has all the individual public keys allotted to each of the two or more research systems 106. In this case, the individual private keys allotted to each of the two or more research systems 106 are different from each other.

The disclosure checking module 304 receives the disclosure information 303 decrypted by the decryption module 301, and checks whether or not the disclosure information 303 is for the own device. The zero-knowledge checking module 305 authenticates the legitimacy of the disclosure information 303 when the decrypted disclosure information 303 is for the own device based on the result checked by the disclosure checking module 304. The authentication result acquired by the zero-knowledge checking module 305 is informed to the operator who is operating the pseudonymization device 300.

The zero-knowledge checking module 310 receives the inverse number distributed value 307 and the disclosure information 309 generated by the inverse number multi-party calculation module 306, and authenticates that the converted pseudonym is for the own device. The authentication result acquired by the zero-knowledge checking module 310 is informed to the operator who is operating the pseudonymization device 300. The zero-knowledge checking module 314 monitors the process of generating the encrypted text 312 executed by the encryption generation module 311, and authenticates that the encrypted text 312 is for the own device. The authentication result by the zero-knowledge checking module 314 is informed to the operator who is operating the pseudonymization device 300.

Next, described is a case of managing personal information, for example, based on an example where the information processing system according to the exemplary embodiment of the invention is employed to a clinical system of medical services.

The information processing system according to the exemplary embodiment of the invention disperses the name of a patient into two or more phrases and encrypts each phrases of the name by using the name encryption device 200 shown in FIG. 1, and converts the name into pseudonym by a unit of phrase by using the two or more pseudonymization devices 300 shown in FIG. 3 to increase the number of authorized people which manage the keys required for encryption and converting into pseudonym so as to make it difficult to leak the keys and the information of the patient. The authorized people are the operators who operate the two or more pseudonymization devices 300. The number of the two or more pseudonymization devices 300 to be placed is m (1 to m), and the number of authorized people corresponding to the two or more pseudonymization devices 300 is m (1 to m). Further, the i-th pseudonymization device 300 among the two or more pseudonymization devices 300 is expressed as D[i].

First, described is the processing for dispersing the name of the patient into two or more phrases and encrypting each phrase of the name by using the name encryption device 200 shown in FIG. 1.

The dispersion module 203 of the name encryption device 200 shown in FIG. 1 reads out the name of the patient (user) stored in the database of the clinical system shown in FIG. 3 and disperses the name into two or more phrases so that the patient cannot be specified by the dispersed name parts 202, and outputs the name parts 202 of the patient by each frame. In the case shown in FIG. 1, the dispersion module 203 disperses the name of the patient into the number of phrases corresponding to the number of pseudonymization devices 300 shown in FIG. 2 set in advance.

Specifically, the dispersion module 203 receives the name 201 of the patient. The received name 201 of the patient is expressed as $u \in Z/pZ$. The dispersion module 203 disperses the name 201 regarding i=1, ..., m to satisfy $u=\Sigma_{i=1}^{m} u[i]$, and allots the dispersed name parts 202 to the pseudonymization devices 300 of i=1, ..., m.

When the dispersion module 203 disperses the name of the patient into the unit of phrase and outputs the dispersed patient name parts 202, the disclosure information generation module 205 generates the information regarding the name parts 202 of each phrase dispersed by the dispersion module 203 as disclosure information 204. The disclosure information generation module 205 generates the disclosure information 204 by including information of the phrase of the name part 202 allotted to each of the two or more pseudonymization devices 300 shown in FIG. 2, information of the name part 202 contained dispersedly in that phrase, and the like.

Specifically, the disclosure information module 205 generates disclosure information v[i] (204) regarding each of the name parts 202 allotted to each of the pseudonymization devices 300 of i=1, ..., m by the dispersion module 203. The disclosure information v[i] is expressed as $v[i] \in Z/pZ$.

When the dispersion module 203 disperses the name of the patient and outputs the dispersed patient name parts 202 and the disclosure information generation module 205 generates the disclosure information 204, the commitment generation module 207 receives all the phrases of the name parts 202 outputted from the dispersion module 203 and the disclosure information 204 outputted from the disclosure information generation module 205, and generates the commitments 206 regarding the dispersed name parts 202 and the disclosure information 204.

Specifically, the commitment generation module 207 generates the commitment d[i] (206) regarding the dispersed name parts 202 and the disclosure information 204 for each of the pseudonymization devices 300 of i=1, ..., m. The commitment d[i] is expressed as $d[i]=g^{u[i]}h^{v[i]}$.

Then, the encryption module 208 generates an encrypted text 209 by encrypting the dispersed name part 202, the disclosure information 204, and the commitment 206 regarding the name part 202 by using the ElGamal encryption system.

Specifically, when generating a key based on the ElGamal encryption system, the encryption module 208 uses a multiplicative group G where the order p is a prime number, and treats g and h as generators of the multiplicative group G selected randomly. Further, the encryption module 208 generates individual public keys y[i] allotted to each of the pseudonymization devices D[i] (300) of i=1, ..., m and general public key y of the ElGamal encryption system for the pseudonymization devices 300 of i=1, ..., m, and discloses those public keys.

Further, the encryption module 208 generates individual private keys x[i] based on the ElGamal encryption system in pairs with the individual public keys y[i] allotted to each of the pseudonymization devices 300 of i=1, ..., m and a general private key x based on the ElGamal encryption system in a pair with the general public key y of the ElGamal encryption system for the pseudonymization devices 300 of i=1, ..., m, and transmits the individual private keys y[i] to the respective pseudonymization devices D[i] (300) of i=1, ..., m.

The encryption module 208 randomly selects the individual public key x[i] allotted to the pseudonymization device D[i] (300), sets the public key x[i] to be in a relation of $x[i] \in Z/pZ$, and sets the general public key x as $x=\Sigma_{i=1}^{m} x[i]$.

Further, the encryption module 208 sets the general private key y and the general private key x to be in a relation of $y=g^x$, and sets the individual public key y[i] and the individual private key x[i] to be in a relation of $y[i]=g^{x[i]}$.

Further, when generating the keys, the encryption module 208 encrypts a message in by using $\chi \in K$ while assuming the key space of the public key encryption system as K {(enc($\chi$, m))}. Further, the encrypted text is decrypted {dec($\chi$, C)} by the pseudonymization device 300 to be described later by using $\chi \in K$.

Specifically, the encryption module 208 uses $\phi^{-1}\phi=1$ as the multiplicative group G and performs encryption according to mapping $\phi$:K, and the pseudonymization device 300 decrypts K from the relation of $\phi$ and $\phi^{-1}im\phi$. Further, it is assumed that K is selected to be able to structure such mapping.

Further, the encryption module 208 randomly selects $\chi[i] \in k$, $w[i] \in Z/pZ$, generates the encrypted text of the dispersed name parts 202 by the individual public keys of the ElGamal encrypted text regarding each of all the pseudonymization devices 300 of i=1, ..., m, generates the encrypted text of the disclosure information 204 and the commitments 206 by the common public key of the ElGamal encrypted text, and outputs those as the encrypted text 209.

The common key encrypted text using the common public key is expressed as $(g'[i], y'[i])=(g^{w[i]}, \phi(\chi[i]) y[i]^{w[i]}) \epsilon [i] = enc(\chi[i], (u[i], v[i])$. The lengths of (u[i], v[i]) are set to be 2|p| by padding. Note here that $((g'[i], y'[i]), \epsilon[i])$ i=1, ..., m is the encrypted text 209 of the disclosure information of the dispersion of the name parts and the commitments thereof based on the public key encryption system.

Next, a case of generating pseudonym based on the dispersed name parts 202 by each of the two or more pseudonymization devices 300 will be described.

The number of the two or more pseudonymization devices 300 is defined as m, and the i-th pseudonymization device 300 of 1 to m-th devices is expressed as D[i]. Each of the pseudonymization devices D[i] (300) regarding i=1, ..., m holds a randomly selected individual pseudonymization key $s[i] \epsilon Z/pZ$. A common pseudonymization key s in common to the two or more pseudonymization devices 300 is defined as $s=\Sigma_{i=1}^{m} s[i]$.

It is assumed here that $s \epsilon Z/pZ$ is the pseudonymization key used for converting into the pseudonym, and the commitment of the pseudonymization key is $c=g^s h^r$.

That is, the pseudonymization key s is dispersedly allotted to the two or more pseudonymization devices 300 in a form of s[i], and the commitment c of the pseudonymization key is $c=\Pi_{i=1}^{m} c[i]$. Thus, the commitment of the pseudonymization key is disclosed. Note here that c[i] allotted to each of the pseudonymization devices 300 is called a dispersion of the commitment of the pseudonymization key, and s[i] allotted to each of the pseudonymization devices 300 is called a dispersion of the pseudonymization key. A set of (g, h) is called a parameter of the commitment.

Regarding the two or more pseudonymization devices 300 of i=1, ..., m, it is assumed that the commitment c[i] of the pseudonymization key allotted to each pseudonymization device D[i] (300) is $c[i]=g^{s[i]} h^{r[i]}$, and that c[i] is disclosed.

Further, it is assumed that the zero-knowledge proof of the knowledge of s[i] and r[i] satisfying $c[i]=g^{s[i]} h^{r[i]}$ is done by each pseudonymization device D[i] (300) for the operator thereof.

Further, it is assumed that that the zero-knowledge proof of the knowledge of x [i] satisfying $y[i]=g^{x[i]}$ is done by each pseudonymization device D[i] (300) to the operator thereof.

Regarding the two or more pseudonymization devices 300 of i=1, ..., m, each pseudonymization device D[i] (300) holds $r[i] \epsilon Z/pZ$. It is defined that r is $r=\Sigma_{i=1}^{m} r[i]$. Further, it is assumed that the zero-knowledge proof of the knowledge satisfying $y[i]=g^{x[i]}$ is done by the pseudonymization device D[i] (300) to the operator of each pseudonymization device 300.

Upon receiving the encrypted text 209 from the encryption device 200, the decryption module 301 of the pseudonymization device D[i] (300) decrypts the encrypted text 209 by the individual private key held individually to acquire the dispersed name part 302 and the disclosure information 303. The dispersed name part 302 corresponds to the name part 202 dispersed and allotted to the pseudonymization devices D[I] (300) by the dispersion module 203 shown in FIG. 1. Further, the disclosure information 303 corresponds to the disclosure information 204 regarding the name part 202 allotted to the pseudonymization device D[I] (300) by the disclosure information generation module 205 shown in FIG. 1.

When decrypting the encrypted text 209, the encryption module 301 of the pseudonymization device D[I] (300) decrypts only the name part 302 and the disclosure information 303 allotted thereto out of the dispersed name parts 302 contained in the encrypted text 209, since each module 301 has the different individual private key from each other.

Specifically, the decryption module 301 of the pseudonymization device D[I] (300) decrypts the ElGamal encrypted text (g'[i], y'[i]) by using the private key x[i] allotted to the own device. Further, the encryption module 301 calculates inverse of mapping $\phi$ to acquire $\chi'[i]=\phi^{-1}(y''[i]/g''[i]^{x[i]})$. Furthermore, the decryption module 301 acquires (u'[i], v'[i]) $=dec(\chi[i], \epsilon[i])$ which corresponds to the dispersed name part 302 and the disclosure information 303.

When the decryption processing is completed, the disclosure information checking module 304 receives the decrypted name part 302 and the disclosure information 303, and checks that $d[i]=g^{u'[i]} h^{v'[i]}$ applies so as to check that the dispersed name part u[i] (302) allotted to the own device corresponds to the disclosure information d[i] (303).

Specifically, when checking executed by the disclosure information checking module 304 is completed, the zero-information proof module 305 receives the information from the disclosure information checking module 304. In a case where $d[i]=g^{u'[i]} h^{v'[i]}$ does not apply, the zero-knowledge proof module 305 informs the operator of the pseudonymization device D[I] (300) the illegitimacy of decrypting the encrypted text through executing zero-knowledge proof of the legitimacy of decryption.

When receiving the information from the disclosure information checking module 304 and $d[i]=g^{u'[i]} h^{v'[i]}$ applies, the zero-knowledge proof module 305 informs the operator of the pseudonymization device D[I] (300) the zero-knowledge proof of the name part u[i] (302) and the disclosure information v[i] (303) with which an expression $d[i]=g^{u'[i]} h^{v'[i]}$ applies.

Further, the inverse number multi-party calculation module 306 of the pseudonymization device D[I] (300) holds a randomly selected $r[i] \epsilon Z/pZ$, and has a knowledge of s[i]+u[i], r[i]+v[i]. Note that s[i] is an individual pseudonymization key, u[i] is the dispersed name part 302 allotted to the own device, and v[i] is the disclosure information 303 regarding the own device. It is defined that r is $r=\Sigma_{i=1}^{m} r[i]$. Further, $c[i]d[i]=g^{s[i]+u[i]} h^{r[i]+v[i]}$, and (s [i]+u[i]) i=1, ..., m is dispersion of u+s.

The inverse number multi-party calculation modules 306 of all the pseudonymization devices 300 (i=1, ..., m) cooperate with each other by a communication 315 to conduct a safe multi-party calculation to acquire t[i], $w[i] \epsilon Z/pZ$, and $f[i] \epsilon G$ satisfying $\Sigma_{i=1}^{m} t[i]=1/(u+s)$ and $f[i]=g^{t[i]} h^{w[i]}$.

Further, the inverse-number multi-party calculation module 306 of the pseudonymization device D[I] (300) discloses f[i] mentioned above.

Note here that t[i] is dispersion 307 of the inverse number of the sum of the name u and the pseudonymization key s, f[i] is a commitment 308 regarding the dispersion 307 of the inverse number of the sum of the name u and the pseudonymization key s, and w[i] is disclosure information 309 for disclosing the commitment 308 regarding the dispersion 307 of the inverse number of the sum of the name u and the pseudonymization keys.

After the inverse number multi-party calculation modules 306 of the pseudonymization devices 300 (i=1, ..., m) cooperate with each other by the communication 315 to conduct the safe multi-party calculation, the zero-knowledge proof module 310 of the pseudonymization device D[I] (300) receives the dispersion 307 of the inverse number, the commitment 308, and the disclosure information 309 calculated by the inverse number multi-party calculation module 306. The inverse number multi-party calculation modules 306 of all the pseudonymization devices 300 (i=1, ..., m) cooperate with each other to conduct the zero-knowledge proof of the knowledge of s, u, and w which satisfy $\Pi_{i=1}{}^m c"[i]d"[i]=g^{s+u}$, $\Pi_{i=1}{}^m f[i]=g^{1/(s+u)}h^w$ to the operator of the pseudonymization device D[I] (300).

The encrypted text generation module 311 of the pseudonymization device D[I] (300) randomly selects $z[i] \in Z/pZ$, generates an inverse number dispersion encrypted text 312 $(g"[i], y"[i])=(g^{v[i]}, g^{t[i]}y^{v[i]})$, and discloses it as an inverse number encrypted text 311.

Specifically, the encrypted text generation modules 311 of all the pseudonymization devices D[I] (300) generate an ElGamal encrypted text 313 of $g^{1/(u+s)}$ as $(\Pi_{i=1}{}^m g"[i], \Pi_{i=1}{}^m y"[i])$. Here, $g^{1/(u+s)}$ is the pseudonym of the name part u based on the pseudonymization keys.

Further, the zero-knowledge proof module 314 of the pseudonymization device D[I] (300) conducts the zero-knowledge proof of the knowledge of $t[i], w[i], v[i] \in Z/pZ$ which satisfy $f[i]=g^{t[i]}h^{w[i]}$, $(g"[i], y"[i])=(g^{v[i]}, g^{t[i]}y^{v[i]})$.

According to each of the exemplary embodiments described above, the correspondence between the name and pseudonym according to the pseudonymization key becomes a simple algebraic relation. This makes it easy to conduct the zero-knowledge proof of the correspondence between the name and the pseudonym while dispersedly holding the pseudonymization keys. Since the keys can be held dispersedly, it is necessary to seize the keys from all the authorized people which hold the keys dispersedly in order to acquire the entire pseudonymization keys. Thus, compared to the case where it is only necessary to seize the key from a single authorized person, the difficulty of seizing the keys is increased. Further, both the input and output are encrypted, so that the chances for the authorized people to acquire personal information of the users become decreased.

As described above, the present invention can constitute the system which can handle the data of the user by taking the privacy of the user into consideration through converting the name of the user into the pseudonym. For example, in a database and the like handling a vast amount of clinical data of patients, the data can be analyzed without revealing the name of the user through converting the name of the user into the pseudonym. With such method, it is possible to build a system with which the corresponding relation between the name and pseudonym is not easily leaked.

Each of the embodiments described above is merely presented as the preferable embodiment of the present invention, and various modifications are possible within the scope of the present invention. For example, processing for achieving the functions of the device may be executed by causing the device to load a program for achieving the functions of the encryption device. Further, the program may be transmitted to other computers by the transmission wave via CD-ROMs, magneto-optical disks, or the like, which are recording media that can be read by computers, or via the Internet, telephone lines, or the like as transmission media. Furthermore, a form with which the functions of the device are achieved collectively by another device and a form with which the functions are achieved in a variant manner by additional devices are also within the scope of the present invention.

INDUSTRIAL APPLICABILITY

The present invention makes it difficult to leak information, and makes it easy to conduct the zero-knowledge proof by employing a simple algebraic operation for the conversion into the pseudonym. Thus, the present invention is capable of contributing to protection of personal information and the like, for example.

REFERENCE NUMERALS

200 Name encryption device
203 Dispersion module
205 Disclosure information generation module
207 Commitment generation module
208 Encryption module
300 Pseudonymization device
301 Decryption module
306 Inverse number multi-party calculation module
310 Encrypted text generation module

The invention claimed is:

1. A name encryption device which encrypts a name of a user, comprising:
   a dispersion module which disperses the meaningful name of the user into a plurality of meaningless phrases by a unit of dispersion with which the user cannot be specified by dispersed name parts;
   a disclosure information generation module which generates information for identifying the plurality of meaningless phrases dispersed by the dispersion module;
   a commitment generation module which generates correlation information for correlating the plurality of meaningless phrases and the information for each of the dispersed name parts; and
   an encryption module which uses an ElGamal encryption system as an encryption system, generates a number of pairs of public keys and private keys required for the ElGamal encryption system corresponding to a number of the pseudonymization devices provided in advance for decrypting an encrypted name part and converting the decrypted name part into a pseudonym, generates a pair of the public key and private key required for a public key encryption system, generates an encrypted text of the dispersed name part and the correlation information by using the public key of the ElGamal encryption system, and generates an encrypted text of the disclosure information by using the public key of the public key encryption system.

2. A pseudonymization device which decrypts an encrypted name part and converts the decrypted name part into a pseudonym wherein the encrypted name part is a name part that is dispersed by a unit of dispersion with which a user cannot be specified by the dispersed name parts of the user, disclosure information regarding the dispersed name parts and the dispersed name parts are correlated by correlation information, and the dispersed name parts and the correlation information are encrypted, the pseudonymization device further comprising:
   a decryption module which receives an encrypted text and refers to the correlation information of the encrypted text by using encryption information allotted to an own device to decrypt the dispersed and encrypted name part allotted to the own device, and also decrypts the encrypted disclosure information by using the allotted encryption information;
   an inverse number calculation module which includes a pseudonymization key for converting the dispersed and encrypted name part into the pseudonym, performs a multi-party calculation by conducting a communication mutually with another pseudonymization device, disperses an inverse number of a sum of the encrypted name parts and the pseudonymization key so as not to overlap with the pseudonym generated by another pseudonymization device to calculate a dispersion value of the inverse number, and generates it as information of the pseudonym, by using the pseudonymization key; and an encrypted text generation module which generates an encrypted text containing the pseudonym generated by the inverse number multi-party calculation module, the correlation information, and the disclosure information, and discloses the encrypted text on a communications net as an encrypted text.

3. The pseudonymization device as claimed in claim 2, wherein the inverse number calculation module generates a commitment regarding the converted pseudonym and disclosure information for disclosing the converted pseudonym.

4. The pseudonymization device as claimed in claim 2, further comprising:

a disclosure checking module which receives the disclosure information decrypted by the decryption module, and checks whether or not the disclosure information is for the own device;

a zero-knowledge checking module which authenticates a legitimacy of the disclosure information when the decrypted disclosure information is for the own device based on a result checked by the disclosure checking module;

a first zero-knowledge checking module which receives the inverse number distributed value and the disclosure information generated by the inverse number multi-party calculation module, and authenticates that the converted pseudonym is for the own device; and a second zero-knowledge checking module which monitors process of generating the encrypted text executed by the encryption generation module, and authenticates that the encrypted text is for the own device.

5. An information management system configured by combining a name encryption device which encrypts a name of a user and a pseudonymization device which decrypts a name part encrypted by the name encryption device and converts the decrypted name part into a pseudonym, wherein the name encryption device comprising:

a dispersion module which disperses the meaningful name of the user into a plurality of meaningless phrases by a unit of dispersion with which the user cannot be specified by the dispersed name parts;

a disclosure information generation module which generates information for identifying the plurality of meaningless phrases dispersed by the dispersion module;

a commitment generation module which generates correlation information for correlating the plurality of meaningless phrases and the information for identification for each of the dispersed name parts; and an encryption module which uses an ElGamal encryption system as an encryption system, generates a number of pairs of public keys and private keys required for the ElGamal encryption system corresponding to a number of the pseudonymization devices provided in advance for decrypting an encrypted name part and converting the decrypted name part into a pseudonym, generates a pair of the public key and the private key required for a public key encryption system, generates an encrypted text of the dispersed name part and the correlation information by using the public key of the ElGamal encryption system, and generates an encrypted text of the disclosure information by using the public key of the public key encryption system, and the pseudonymization device comprising:

a decryption module which receives the encrypted text encrypted by the name encryption device and refers to the correlation information of the encrypted text by using encryption information allotted to an own device to decrypt the dispersed and encrypted name part allotted to the own device, and also decrypts encrypted disclosure information by using the allotted encryption information;

an inverse number calculations module which includes a pseudonymization key for converting the dispersed and encrypted name part into the pseudonym, performs a multi-party calculation by conducting a communication mutually with another pseudonymization device, disperses an inverse number of a sum of the encrypted name parts and the pseudonymization key so as not to overlap with the pseudonym generated by another pseudonymization device to calculate a dispersion value on the inverse number, and generates it as information of the pseudonym, by using the pseudonymization key; and an encrypted text generation module which generates an encrypted text containing the pseudonym generated by the inverse number multi-party calculation module, the commitment, and the disclosure information, and discloses the encrypted text on a communication net as an encrypted text.

6. A name encryption method for encrypting a name of a user, comprising:

dispersing the meaningful name of the user into a plurality of meaningless phrases by a unit of dispersion with which the user cannot be specified by dispersed name parts;

generating information for identifying the plurality of meaningless phrases dispersed;

generating correlation information for correlating the plurality of meaningless phrases and the information for identification for each of the dispersed name parts; and using an ElGamal encryption system as an encryption system, generating a number of pairs of public keys and private keys required for the ElGamal encryption system corresponding to a number of the pseudonymization devices provided in advance for decrypting an encrypted name part and converting the decrypted name part into a pseudonym, generating a pair of the public key and private key required for a public key encryption system, generating an encrypted text of the dispersed name part and the correlation information by using the public key of the ElGamal encryption system, and generating an encrypted text of the disclosure information by using the public key of the public key encryption system.

7. A pseudonymization method for decrypting an encrypted name part and converts the decrypted name part into a pseudonym wherein the encrypted name part is a name part that is dispersed by a unit of dispersion with which a user cannot be specified by dispersed name parts of the user, disclosure information regarding the dispersed name parts and the dispersed name parts are correlated by correlation information, and the dispersed name parts and the correlation information are encrypted, the pseudonymization device further comprising:

receiving an encrypted text and referring to the correlation information of the encrypted text by using encryption information allotted to an own device to decrypt the dispersed and encrypted name part allotted to the own device, and also decrypting encrypted disclosure information by using the allotted encryption information;

performing a multi-party calculation by conducting a communication mutually with another pseudonymization device, dispersing an inverse number of a sum of the encrypted name parts and the pseudonymization key so as not to overlap with the pseudonym generated by another pseudonymization device to calculate a dispersion value of the inverse number, and generating it as information of the pseudonym, by using a pseudonymization key for converting the encrypted name part into the pseudonym; and generating an encrypted text containing the pseudonym generated by the inverse number multi-party calculation module, the correlation information, and the disclosure information, and disclosing the encrypted text on a communications net as an encrypted text.

8. A method for performing information management by combining a name encryption device which encrypts a name of a user and a pseudonymization device which decrypts a name part encrypted by the name encryption device and converts the decrypted name part into a pseudonym, the method comprising:

dispersing the meaningful name of the user into a plurality of meaningless phrases by a unit of dispersion with which the user cannot be specified by the dispersed name parts;

generating information for identifying the plurality of meaningless phrases;

generating correlation information for correlating the plurality of meaningless phrases and the information for identification for each of the dispersed name parts;

using an ElGamal encryption system as an encryption system, generating a number of pairs of public keys and private keys required for the ElGamal encryption system corresponding to a number of the pseudonymization devices provided in advance for decrypting an encrypted name part and converting the decrypted name part into a pseudonym, generating a pair of the public key and the private key required for a public key encryption system, generating an encrypted text of the dispersed name part and the correlation information by using the public key of the ElGamal encryption system, and generating an encrypted text of the disclosure information by using the public key of the public key encryption system;

receiving the encrypted text encrypted by the name encryption device and referring to the correlation information of the encrypted text by using encryption information allotted to an own device to decrypt the dispersed and encrypted name part allotted to the own device, and also decrypting the encrypted disclosure information by using the allotted encryption information;

performing a multi-party calculation by conducting a communication mutually with another pseudonymization device, dispersing an inverse number of a sum of the encrypted name parts and the pseudonymization key so as not to overlap with the pseudonym generated by another pseudonymization device to calculate a dispersion value on the inverse number, and generating it as information of the pseudonym, by using the pseudonymization key for converting the encrypted name part into the pseudonym; and generating an encrypted text containing the pseudonym generated by the inverse number multi-party calculation module, the commitment, and the disclosure information, and disclosing the encrypted text on communications net as an encrypted text.

9. A non-transitory computer readable recording medium storing a name encryption program for encrypting a name of a user, causing a computer to execute functions of:

dispersing the meaningful name of the user into a plurality of meaningless phrases by a unit of dispersion with which the user cannot be specified by dispersed name parts;

generating information for identifying the plurality of meaningless phrases dispersed;

generating correlation information for correlating the plurality of meaningless phrases and the information for identification for each of the dispersed name parts; and using an ElGamal encryption system as an encryption system, generating a number of pairs of public keys and private keys required for the ElGamal encryption system corresponding to a number of the pseudonymization devices provided in advance for decrypting an encrypted name part and converting the decrypted name part into a pseudonym, generating a pair of the public key and private key required for a public key encryption system, generating an encrypted text of the dispersed name part and the correlation information by using the public key of the ElGamal encryption system, and generating an encrypted text of the disclosure information by using the public key of the public key encryption system.

10. A non-transitory computer readable recording medium storing a pseudonymization program for decrypting an encrypted name part and converts the decrypted name part into a pseudonym, wherein the encrypted name part is a name part that is dispersed by a unit of dispersion with which a user cannot be specified by dispersed name parts of the user, disclosure information regarding the dispersed name parts and the dispersed name parts are correlated by correlation information, and the dispersed name parts and the correlation information are encrypted, the pseudonymization device further causing a computer to execute functions of:

receiving an encrypted text and referring to the correlation information of the encrypted text by using encryption information allotted to an own device to decrypt the dispersed and encrypted name part allotted to the own device, and also decrypting the encrypted disclosure information by using the allotted encryption information;

performing a multi-party calculation by conducting a communication mutually with another pseudonymization device, dispersing an inverse number of a sum of the encrypted name parts and the pseudonymization key so as not to overlap with the pseudonym generated by another pseudonymization device to calculate a dispersion value of the inverse number, and generating it as information of the pseudonym, by using a pseudonymization key for converting the dispersed and encrypted name part into the pseudonym; and generating an encrypted text containing the pseudonym generated by the inverse number multi-party calculation module, the correlation information, and the disclosure information, and disclosing the encrypted text on a communications net as an encrypted text.

* * * * *